(12) United States Patent
Bohn et al.

(10) Patent No.: US 10,254,464 B2
(45) Date of Patent: Apr. 9, 2019

(54) TRANSPARENT DISPLAY BACKLIGHT ASSEMBLY

(71) Applicant: Microsoft Technology Licensing, LLC, Redmond, WA (US)

(72) Inventors: David D. Bohn, Fort Collins, CO (US); Rod G. Fleck, Bellevue, WA (US); Derek Leslie Knee, Fort Collins, CO (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/341,881

(22) Filed: Nov. 2, 2016

(65) Prior Publication Data

US 2017/0068039 A1    Mar. 9, 2017

Related U.S. Application Data

(62) Division of application No. 14/299,859, filed on Jun. 9, 2014, now Pat. No. 9,541,697, which is a division
(Continued)

(51) Int. Cl.
*F21V 7/04* (2006.01)
*F21V 8/00* (2006.01)
(Continued)

(52) U.S. Cl.
CPC ......... *G02B 6/0041* (2013.01); *G02B 6/0033* (2013.01); *G02B 6/0035* (2013.01);
(Continued)

(58) Field of Classification Search
CPC .. G02B 6/0033; G02B 6/0035; G02B 6/0036; G02B 6/004; G02B 6/0041;
(Continued)

(56) References Cited

U.S. PATENT DOCUMENTS

| 5,644,369 A | 7/1997 | Jachimowicz et al. |
| 5,745,203 A | 4/1998 | Valliath et al. |

(Continued)

FOREIGN PATENT DOCUMENTS

| CN | 1247675 | 3/2000 |
| CN | 1448833 | 10/2003 |

(Continued)

OTHER PUBLICATIONS

"Final Office Action", U.S. Appl. No. 12/914,761, dated Mar. 17, 2014, 15 pages.
(Continued)

*Primary Examiner* — Jason M Han
(74) *Attorney, Agent, or Firm* — NovoTechIP International PLLC

(57) ABSTRACT

In embodiments of a transparent display backlight assembly, a backlight panel is operable as a transparent panel, and a light source generates light that the backlight panel directs from the light source to illuminate a display panel of a display device. Light refraction features refract and scatter the light, where the light refraction features are spaced for approximate transparency of the backlight panel and to illuminate the display panel. An active diffuser can be implemented as an additional transparent panel and operable for activation to diffuse the light from the backlight panel that illuminates the display panel.

19 Claims, 6 Drawing Sheets

Related U.S. Application Data of application No. 12/977,852, filed on Dec. 23, 2010, now Pat. No. 8,770,813.

(51) Int. Cl.
*G02F 1/1335* (2006.01)
*G02F 1/1333* (2006.01)
*B82Y 20/00* (2011.01)

(52) U.S. Cl.
CPC ......... *G02B 6/0036* (2013.01); *G02B 6/0043* (2013.01); *G02B 6/0053* (2013.01); *G02B 6/0068* (2013.01); *G02B 6/0073* (2013.01); *G02B 6/0076* (2013.01); *G02F 1/133615* (2013.01); *B82Y 20/00* (2013.01); *G02F 1/13338* (2013.01); *G02F 2001/133342* (2013.01); *G02F 2001/133622* (2013.01); *G02F 2203/01* (2013.01); *Y10S 977/834* (2013.01)

(58) Field of Classification Search
CPC .. G02B 6/0043; G02B 6/0051; G02B 6/0053; G02B 6/0058; G02B 6/0068; G02B 6/0073; G02B 6/0076; G02F 1/13338; G02F 1/133615; G02F 2001/133342; G02F 2203/01
USPC .................................................. 362/600–634
See application file for complete search history.

(56) References Cited

U.S. PATENT DOCUMENTS

| | | |
|---|---|---|
| 5,808,711 A | 9/1998 | Suppelsa et al. |
| 5,896,575 A | 4/1999 | Higginbotham et al. |
| 6,036,327 A | 3/2000 | Blonder et al. |
| 6,118,420 A | 9/2000 | Yamamoto |
| 6,215,920 B1 | 4/2001 | Whitehead et al. |
| 6,246,450 B1 | 6/2001 | Inbar |
| 6,452,582 B1 | 9/2002 | Rolston |
| 6,618,104 B1 | 9/2003 | Date et al. |
| 6,834,974 B2 | 12/2004 | Lee et al. |
| 6,906,762 B1 | 6/2005 | Witehira et al. |
| 6,961,167 B2 | 11/2005 | Prins et al. |
| 7,128,432 B1 | 10/2006 | Stern et al. |
| 7,154,469 B2 | 12/2006 | Weng |
| 7,205,959 B2 | 4/2007 | Henriksson |
| 7,230,764 B2 | 6/2007 | Mullen et al. |
| 7,273,291 B2 | 9/2007 | Kim et al. |
| 7,658,528 B2 | 2/2010 | Hoelen et al. |
| 7,701,517 B1 | 4/2010 | Geronimi |
| 7,703,973 B2 * | 4/2010 | Zhu ............... G02B 6/0018 362/297 |
| 7,804,502 B2 | 9/2010 | Azuma |
| 8,035,879 B2 | 10/2011 | Wang et al. |
| 8,231,257 B2 | 7/2012 | Griffiths et al. |
| 8,362,992 B2 | 1/2013 | Kuhlman et al. |
| 8,770,813 B2 | 7/2014 | Bohn et al. |
| 8,941,683 B2 | 1/2015 | Son et al. |
| 9,541,697 B2 | 1/2017 | Bohn et al. |
| 2001/0038425 A1 | 11/2001 | Lee |
| 2002/0109916 A1 | 8/2002 | Moshrefzadeh |
| 2003/0020707 A1 | 1/2003 | Kangas et al. |
| 2003/0201969 A1 | 10/2003 | Hiyama et al. |
| 2003/0210222 A1 | 11/2003 | Ogiwara et al. |
| 2004/0075628 A1 | 4/2004 | Chien et al. |
| 2004/0150584 A1 | 8/2004 | Chuman et al. |
| 2004/0150653 A1 | 8/2004 | Sakamaki et al. |
| 2004/0196525 A1 | 10/2004 | Fujii et al. |
| 2005/0024319 A1 | 2/2005 | Amirzadeh et al. |
| 2005/0052342 A1 | 3/2005 | Wu et al. |
| 2005/0140641 A1 | 6/2005 | Kim et al. |
| 2005/0215323 A1 | 9/2005 | Miyamoto et al. |
| 2005/0276295 A1 | 12/2005 | Kahen et al. |
| 2006/0044286 A1 | 3/2006 | Kohlhaas et al. |
| 2006/0092355 A1 | 5/2006 | Yang et al. |
| 2006/0152658 A1 | 7/2006 | Ozawa et al. |
| 2006/0262976 A1 | 11/2006 | Hart et al. |
| 2007/0018585 A1 | 1/2007 | Ijzerman et al. |
| 2007/0078007 A1 | 4/2007 | Maekawa et al. |
| 2008/0055701 A1 | 3/2008 | Liu et al. |
| 2008/0063808 A1 | 3/2008 | Stumpe et al. |
| 2008/0111958 A1 | 5/2008 | Kleverman et al. |
| 2008/0136775 A1 | 6/2008 | Conant |
| 2008/0186255 A1 | 8/2008 | Cohen et al. |
| 2008/0198292 A1 | 8/2008 | Marra et al. |
| 2008/0262910 A1 | 10/2008 | Altberg et al. |
| 2008/0297880 A1 | 12/2008 | Steckl et al. |
| 2009/0046220 A1 | 2/2009 | Tsuchiya et al. |
| 2009/0079667 A1 | 3/2009 | Schlottmann et al. |
| 2009/0140950 A1 | 6/2009 | Woo et al. |
| 2009/0219253 A1 | 9/2009 | Izadi et al. |
| 2009/0232509 A1 | 9/2009 | Heikenfeld et al. |
| 2009/0295731 A1 | 12/2009 | Kim et al. |
| 2010/0045705 A1 | 2/2010 | Vertegaal et al. |
| 2010/0085510 A1 | 4/2010 | Okuyama et al. |
| 2010/0100842 A1 | 4/2010 | Kim |
| 2010/0128015 A1 | 5/2010 | Feenstra et al. |
| 2010/0141568 A1 | 6/2010 | Lee et al. |
| 2010/0144394 A1 | 6/2010 | Han et al. |
| 2010/0157410 A1 | 6/2010 | Kim et al. |
| 2010/0165634 A1 | 7/2010 | Hong et al. |
| 2010/0177025 A1 | 7/2010 | Nagata et al. |
| 2010/0207964 A1 | 8/2010 | Kimmel et al. |
| 2010/0245321 A1 | 9/2010 | Ogita et al. |
| 2010/0265435 A1 | 10/2010 | Hwang et al. |
| 2010/0277439 A1 | 11/2010 | Charlier et al. |
| 2011/0040539 A1 | 2/2011 | Szymczyk et al. |
| 2011/0058113 A1 * | 3/2011 | Threlkel .............. E06B 9/24 349/1 |
| 2011/0124376 A1 | 5/2011 | Kim et al. |
| 2011/0137561 A1 | 6/2011 | Kankainen |
| 2011/0161875 A1 | 6/2011 | Kankainen |
| 2011/0164047 A1 | 7/2011 | Pance |
| 2011/0164163 A1 | 7/2011 | Bilbrey et al. |
| 2011/0276556 A1 | 11/2011 | Meier et al. |
| 2011/0285622 A1 | 11/2011 | Marti et al. |
| 2012/0099250 A1 | 4/2012 | Robinson et al. |
| 2012/0102438 A1 | 4/2012 | Robinson et al. |
| 2012/0105306 A1 | 5/2012 | Fleck |
| 2012/0105428 A1 | 5/2012 | Fleck |
| 2012/0105474 A1 | 5/2012 | Cudalbu et al. |
| 2012/0105475 A1 | 5/2012 | Tseng |
| 2012/0105487 A1 | 5/2012 | Son et al. |
| 2012/0162268 A1 | 6/2012 | Fleck et al. |
| 2012/0162269 A1 | 6/2012 | Bohn et al. |
| 2012/0163021 A1 | 6/2012 | Bohn et al. |
| 2012/0235827 A1 | 9/2012 | Chi et al. |
| 2013/0207896 A1 | 8/2013 | Robinson et al. |
| 2014/0286047 A1 | 9/2014 | Bohn et al. |

FOREIGN PATENT DOCUMENTS

| | | |
|---|---|---|
| CN | 1470045 | 1/2004 |
| CN | 1189047 | 2/2005 |
| CN | 1573448 | 2/2005 |
| CN | 1240042 | 2/2006 |
| CN | 1879139 | 12/2006 |
| CN | 101184953 | 5/2008 |
| CN | 101263541 | 9/2008 |
| CN | 101595409 A | 12/2009 |
| CN | 101681034 | 3/2010 |
| CN | 102419954 | 4/2012 |
| EP | 2169966 | 3/2010 |
| JP | 06289393 | 10/1994 |
| JP | 2002208307 | 7/2002 |
| JP | 2002236218 | 8/2002 |
| JP | 2002320012 | 10/2002 |
| JP | 2004325907 | 11/2004 |
| JP | 2007220347 | 8/2007 |
| JP | 2010508553 | 3/2010 |
| JP | 2010231069 | 10/2010 |
| KR | 20080012005 | 2/2008 |

(56) References Cited

FOREIGN PATENT DOCUMENTS

| KR | 20100038840 | 4/2010 |
|---|---|---|
| TW | I294540 | 3/2008 |
| TW | I2945540 | 3/2008 |
| TW | 201027478 | 7/2010 |
| WO | WO-2008053078 | 5/2008 |
| WO | WO-2009122716 | 10/2009 |
| WO | WO-2009157352 | 12/2009 |
| WO | WO-2010126756 | 11/2010 |

OTHER PUBLICATIONS

"Final Office Action", U.S. Appl. No. 12/917,265, dated Sep. 9, 2013, 22 pages.
"Final Office Action", U.S. Appl. No. 12/977,852, dated May 7, 2013, 12 pages.
"Final Office Action", U.S. Appl. No. 12/977,943, dated Sep. 12, 2013, 13 pages.
"Final Office Action", U.S. Appl. No. 12/977,943, dated Nov. 6, 2014, 16 pages.
"Final Office Action", U.S. Appl. No. 12/977,959, dated Sep. 12, 2013, 14 pages.
"Final Office Action", U.S. Appl. No. 12/977,959, dated Nov. 19, 2014, 14 pages.
"Foreign Notice of Allowance", AU Application No. 2011320628, dated Nov. 6, 2014, 2 pages.
"Foreign Notice of Allowance", CN Application No. 201110358454.2, dated Apr. 7, 2015, 6 Pages.
"Foreign Notice of Allowance", CN Application No. 201110435846.4, dated May 6, 2015, 4 Pages.
"Foreign Notice of Allowance", CN Application No. 201110436269.0, dated Aug. 1, 2014, 6 pages.
"Foreign Office Action", AU Application No. 2011320628, dated Sep. 10, 2014, 3 pages.
"Foreign Office Action", AU Application No. 2011348209, dated Nov. 11, 2014, 2 pages.
"Foreign Office Action", AU Application No. 2015201585, dated Jun. 17, 2016, 5 pages.
"Foreign Office Action", CN Application No. 201110355941.3, dated Aug. 13, 2014, 15 Pages.
"Foreign Office Action", CN Application No. 201110355941.3, dated Dec. 23, 2013, 12 Pages.
"Foreign Office Action", CN Application No. 201110356030.2, dated Dec. 23, 2013, 12 pages.
"Foreign Office Action", CN Application No. 201110358454.2, dated Feb. 8, 2014, 15 pages.
"Foreign Office Action", CN Application No. 201110358454.2, dated Sep. 11, 2014, 15 pages.
"Foreign Office Action", CN Application No. 201110434512.5, dated Jun. 5, 2014, 14 pages.
"Foreign Office Action", CN Application No. 201110435846.4, dated Jul. 23, 2014, 15 Pages.
"Foreign Office Action", CN Application No. 201110435846.4, dated Nov. 29, 2013, 15 Pages.
"Foreign Office Action", CN Application No. 201110435846.4, dated Dec. 16, 2014, 15 pages.
"Foreign Office Action", CN Application No. 201110436269.0, dated Nov. 25, 2013, 18 Pages.
"Foreign Office Action", EP Application No. 11851505.5, dated May 28, 2015, 4 pages.
"Foreign Office Action", IL Application No. 227064, dated Aug. 2, 2016, 5 pages.
"Foreign Office Action", JP Application No. 2013-546409, dated Aug. 25, 2015, 6 pages.
"Foreign Office Action", TW Application No. 100141623, dated Oct. 19, 2015, 15 pages.
"Foreign Office Action", TW Application No. 100141623, dated Mar. 30, 2016, 9 Pages.
"International Search Report and Written Opinion", Application No. PCT/US2011/057479, dated Apr. 10, 2012, 9 pages.
"International Search Report and Written Opinion", Application No. PCT/US2011/066757, dated Sep. 25, 2012, 9 pages.
"Non-Final Office Action", U.S. Appl. No. 12/914,574, dated Apr. 3, 2014, 13 pages.
"Non-Final Office Action", U.S. Appl. No. 12/914,574, dated Oct. 1, 2013, 11 pages.
"Non-Final Office Action", U.S. Appl. No. 12/914,761, dated Aug. 9, 2013, 13 pages.
"Non-Final Office Action", U.S. Appl. No. 12/917,265, dated Mar. 21, 2014, 22 pages.
"Non-Final Office Action", U.S. Appl. No. 12/917,265, dated Apr. 10, 2013, 16 pages.
"Non-Final Office Action", U.S. Appl. No. 12/977,852, dated Nov. 15, 2012, 10 pages.
"Non-Final Office Action", U.S. Appl. No. 12/977,943, dated Apr. 23, 2014, 15 pages.
"Non-Final Office Action", U.S. Appl. No. 12/977,943, dated Dec. 28, 2012, 14 pages.
"Non-Final Office Action", U.S. Appl. No. 12/977,943, dated May 9, 2013, 13 pages.
"Non-Final Office Action", U.S. Appl. No. 12/977,959, dated Apr. 3, 2015, 15 pages.
"Non-Final Office Action", U.S. Appl. No. 12/977,959, dated Apr. 24, 2014, 15 pages.
"Non-Final Office Action", U.S. Appl. No. 12/977,959, dated May 9, 2013, 13 pages.
"Notice of Allowance", U.S. Appl. No. 12/917,265, dated Sep. 15, 2014, 6 pages.
"Notice of Allowance", U.S. Appl. No. 12/977,852, dated Feb. 24, 2014, 6 pages.
"Notice of Allowance", U.S. Appl. No. 14/299,859, dated Aug. 30, 2016, 14 pages.
"Restriction Requirement", U.S. Appl. No. 12/977,852, dated Sep. 6, 2012, 5 pages.
"Restriction Requirement", U.S. Appl. No. 12/977,943, dated Aug. 20, 2012, 6 pages.
"Restriction Requirement", U.S. Appl. No. 14/299,859, dated Mar. 1, 2016, 6 pages.
"Restriction Requirement", U.S. Appl. No. 14/299,859, dated Jun. 29, 2016, 7 pages.
"Supplementary European Search Report", EP Application No. 11851505.5, dated Apr. 23, 2015, 2 pages.
Aleksander,"Possibilities of application of polymer-dispersed liquid crystals in information displays", In Proceedings of SPIE 2004, vol. 5565, Available at <http://lib.semi.ac.cn:8080/tsh/dzzy/wsqk/SPIE/vol5565/5565-304.pdf>, 2004, pp. 304-308.
Giraldo,"Transmissive Electrowetting-Based Displays for Portable Multi-Media Devices", SID 09 Digest, Available at <http://www.liquavista.com/downloads/getFile.aspx?DocID=112>, 2009, pp. 479-482.
Greene,"Two-Sided Touch Screen", Retrieved from: <http://www.technologyreview.in/computing/19300/> on Jun. 21, 2010, Aug. 24, 2007, 4 pages.
Heikenfeld,"Electrowetting Light Valves with Greater than 80% Transmission, Unlimited View Angle, and Video Response", SID 05 Digest, http://www.google.com/url?sa=t&source=web&cd=3&ved=0CBwQFjAC&url=http%3A%2F%2Fwww.ece.uc.edu%2Fdevices%2FDownloads%2FDocuments%2FHeikenfeld_TransELV_SID05.pdf&rct=j&q=Electrowetting%20Light%20Valves%20with%20Greater%20than%2080%25%20Transmission%2C%20Unlim, 2005, pp. 1-4.
Hu,"Electrowetting-Based Total Internal Reflection Chip for Optical Switch and Display", In Proceedings of IEEE/LEOS 2007, Available at <http://ieeexplore.ieee.org/stamp/stamp.jsp?tp=&arnumber=4373844>, 2007, pp. 69-70.
Humphries,"Clear LCD display in development", Retrieved from: <http://www.geek.com/articles/consumer/clear-lcd-display-in-development-2007079/> on, Jul. 9, 2007, 8 pages.
Klosowicz,"Polymer-dispersed liquid crystals as perspective media for displays and optical elements", In Proceedings of Symposium on Photonics Technologies for 7th Framework Program, Available at <http://www.opera2015.org/deliverables/D_4_3_CD-ROM_Wroclaw_Nieuw/6_Proceedings/46_Klosowicz.pdf>, Oct. 2006, pp. 238-241.

(56) References Cited

OTHER PUBLICATIONS

Kwong,"Control of reflectance of liquid droplets by means of electrowetting", Applied Optics, vol. 43, No. 4, Available at <http://www.phas.ubc.ca/ssp/papers/Publications/Control%20of%20Reflectance%20of%20Liquid%20Droplets%20by%20Means%20of%20Electrowetting.pdf>, Feb. 2004, pp. 808-813.

Patel,"Double-Sided Transparent Touch Display would Make Battleship Amazing", Retrieved from: <http://www.engadget.com/2008/08/29/double-sided-transparent-touch-display-would-make-battleship-ama> on Jun. 21, 2010, Aug. 29, 2008, 5 pages.

Wu,"Advanced Organic Light-Emitting Devices for Enhancing Display Performances", Journal of Display Technology, vol. 1, No. 2, Available at <http://ntur.lib.ntu.edu.tw/bitstream/246246/148555/1/37.pdf>, Dec. 2005, pp. 248-266.

"Office Action Issued in Korean Patent Application No. 10-2013-7016000", Dated: Dec. 19, 2017, 5 Pages.

"Office Action Issued in Canadian Patent Application No. 2,822,093", Dated: Jan. 15, 2018, 5 Pages.

"Office Action and Search Report Issued in Taiwan Patent Application No. 100141623", dated Jun. 1, 2018, 8 Pages.

"Office Action and Search Report Issued in Taiwan Patent Application No. 105116891", dated Jun. 1, 2018, 9 Pages.

"Office Action Issued in Taiwan Patent Application No. 105116891", dated Sep. 17, 2018, 9 Pages.

"Office Action Issued in Indian Patent Application No. 4611/CHENP/2013", dated Aug. 31, 2018, 5 Pages.

"Office Action Issued in Taiwan Patent Application No. 100141623", dated Sep. 17, 2018, 4 Pages.

\* cited by examiner

TRANSPARENT DISPLAY BACKLIGHT ASSEMBLY

RELATED APPLICATIONS

This application is a divisional of and claims priority under 35 U.S.C. § 120 to U.S. patent application Ser. No. 14/299,859 filed Jun. 9, 2014 entitled "Transparent Display Backlight Assembly", the disclosure of which is incorporated by reference herein in its entirety. U.S. patent application Ser. No. 14/299,859 is a divisional of and claims priority under 35 U.S.C. § 120 to U.S. patent application Ser. No. 12/977,852 filed Dec. 23, 2010, now U.S. Pat. No. 8,770,813 entitled "Transparent Display Backlight Assembly", the disclosure of which is incorporated by reference herein in its entirety.

BACKGROUND

Mobile phones and portable devices that display information when open or closed are typically implemented with two displays. For example, a mobile phone may have a larger, primary display for use when the device is open, and a smaller, secondary display on the back of the device to display the current time or a notification of an incoming call. The current flip, slide, or swivel type of phone devices allow a user to interact with all of the device functions when the primary display is open. However, many of the device functions may be limited or disabled when the primary display is closed over the device and/or when a smaller, secondary display is in use. Additionally, users typically want the smallest possible device to conveniently carry in a pocket or purse, but also want larger user interface surfaces for a primary display, keypad, and potentially a secondary display. Some tablet notebook computers and/or phones that have a single display may be used when in an open or closed position, but need relatively complex rotating hinges and hardware components to position the display screen for use while open or closed.

SUMMARY

This summary is provided to introduce simplified concepts of a transparent display backlight assembly that are further described below in the Detailed Description. This summary is not intended to identify essential features of the claimed subject matter, nor is it intended for use in determining the scope of the claimed subject matter.

A transparent display backlight assembly is described. In embodiments, a backlight panel is operable as a transparent panel, and a light source generates light that the backlight panel directs from the light source to illuminate a display panel of a display device. Light refraction features refract and scatter the light, where the light refraction features are spaced for approximate transparency of the backlight panel and to illuminate the display panel. An active diffuser can be implemented as an additional transparent panel and operable for activation to diffuse the light from the backlight panel that illuminates the display panel.

In other embodiments, the light refraction features can be implemented as light-scattering particles embedded in the backlight panel; as micro extraction features formed as hemisphere divots into the backlight panel; as diffractive optics that refract designated light wavelengths; and/or as negative prisms formed into the backlight panel, where the negative prisms can be implemented as nano-prisms that increase the transparency of the backlight panel, or as micro-prisms that increase display panel illumination.

BRIEF DESCRIPTION OF THE DRAWINGS

Embodiments of a transparent display backlight assembly are described with reference to the following drawings. The same numbers are used throughout the drawings to reference like features and components.

DETAILED DESCRIPTION

Embodiments of a transparent display backlight assembly are described. A portable device, such as a mobile phone or computer device, includes a display device that can be controlled for transparent and non-transparent display. The display device includes various display panels and surfaces that are assembled between front and back display surfaces of the display device, and different combinations of the display panels and surfaces may be utilized to implement a transparent display. A transparent display backlight assembly can be implemented with a light source that generates light, and with a backlight panel that directs the light to illuminate a display panel of the display device. The backlight panel can include various implementations of light refraction features, such as light-scattering particles embedded in the backlight panel and/or as diffractive optics molded into the backlight panel that refract designated light wavelengths; as micro extraction features formed as hemisphere divots into the backlight panel; and/or as negative prisms formed into the backlight panel. In embodiments, the backlight assembly can be implemented with multiple light guides (also referred to as backlight panels) in a stack configuration.

While features and concepts of the described systems and methods for a transparent display backlight assembly can be implemented in any number of different environments, systems, devices, and/or various configurations, embodiments of a transparent display backlight assembly are described in the context of the following example devices, systems, and configurations.

Figure 1:
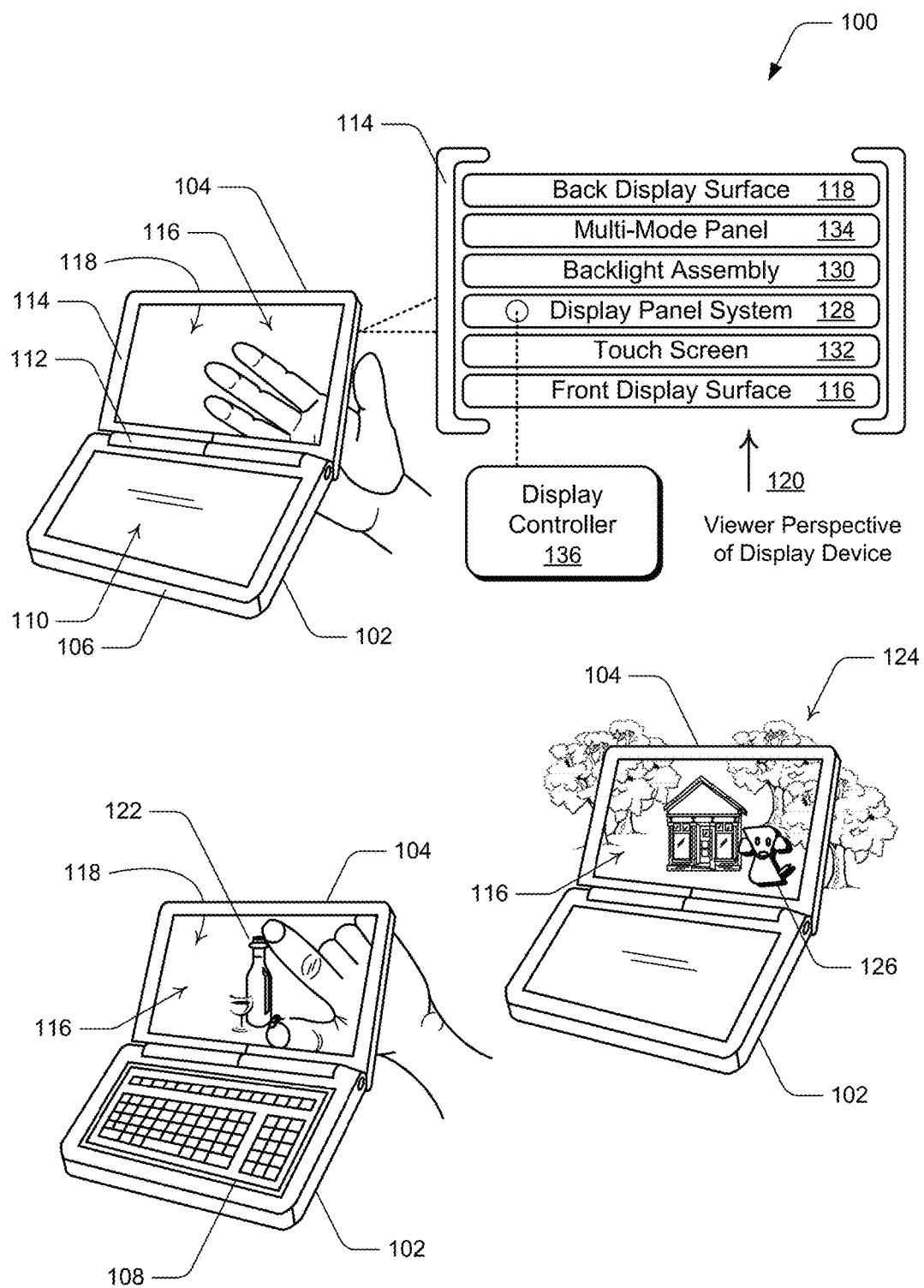
FIG. 1 illustrates examples of a portable device and various embodiments of a transparent display backlight assembly.

FIG. 1 illustrates examples 100 of a portable device 102 in accordance with embodiments of a transparent display backlight assembly. The portable device includes a display device 104 and a handheld base 106 that may include a physical keyboard (shown at 108) or an additional display device 110 as an integrated component of the portable device. The additional display device may be utilized to display text, graphics, images, user interfaces, and/or a virtual keyboard, such as when an implementation of a portable device does not include a physical keyboard. In the examples, the display device 104 is movably coupled at 112 to the handheld base of the portable device, such as with a rotating hinge, slide track, flip mechanism, or other coupling device. The display device can open and close over the handheld base, such as when folded, slid, or flipped closed over the additional display device, folded around to the back of the handheld base, or any position in-between approximately zero degrees (0°) and three-hundred sixty degrees (360°) relative to the handheld base.

The display device 104 includes a display housing 114 that supports various display panels and surfaces that may be utilized to assemble the display device. In this example, the display device includes a front display surface 116, and includes a back display surface 118. The front display surface and the back display surface are viewable from opposite sides of the display device. A user of the portable device 102 may generally view the display device 104 through the front display surface 116, shown for reference as a viewer perspective of the display device at 120.

A displayed image 122 may be viewable through the front and back display surfaces, and as illustrated, the display device 104 is transparent. As described herein, the transparency of a display device may be a percentage of transparency as measured with light detection equipment and/or as visually determined or perceived by a user when viewing an environment as seen through the various display panels and surfaces of the display device.

In the illustrated examples, a hand may be viewable through the front and back display surfaces of the display device, such as when viewed through the front of the display device. An environment 124 behind the display device can also be viewable through the front and back display surfaces of the display device, and a displayed image may appear projected into the environment for an augmented view of reality. For example, a displayed image 126 of the dog may appear projected into the environment 124 that includes trees and a building behind the display device and viewable through the front and back display surfaces of the display device.

In addition to the front display surface 116 and the back display surface 118, the display device 104 includes a display panel system 128 that is located between the front and back display surfaces. The display panel system is implemented to display images that are then viewable through the front and/or back surfaces of the display device. The display device includes a backlight assembly 130 that illuminates the display panel for image display. The backlight assembly includes a light source, a backlight panel that directs light generated by the light source, and/or a diffuser that scatters and diffuses the light to uniformly illuminate the display panel.

The display device may also include a touch screen 132 that is located between the front and back display surfaces to sense a touch input to either of the front display surface or the back display surface. Alternatively, the display device may include a first touch screen located proximate the front display surface and a second touch screen located proximate the back display surface, and the touch screens sense touch inputs to the respective front and back display surfaces.

The display device 104 includes a multi-mode panel 134 located between the front display surface 116 and the back display surface 118. In embodiments, the multi-mode panel is operable to switch on and off, such as to prevent an image from being viewable through the front display surface or the back display surface, or for transparency to permit the image being viewable through the front and back display surfaces. The multi-mode panel may be implemented to switch on and/or off the entire panel, sections of the panel, and/or individual pixels of the panel.

The display device 104 can include a display controller 136 that is implemented to control display modes of the display device for transparent and non-transparent display. The display controller can be implemented as computer-executable instructions, such as a software component, and executed by one or more processors to implement various embodiments for a transparent display. In practice, the portable device 102 is implemented with a processor (e.g., a CPU), a graphics processor (e.g., a GPU), and an internal display controller to drive display content to the display device. In the display device 104, the display panel system 128 may include the display controller 136 that drives each pixel according to the type of display at various voltages.

In various configurations, such as when the display device 104 is positioned open relative to the handheld base 106 of the portable device (e.g., as illustrated in the examples), the display controller 136 can activate the display device to prevent a displayed image from being viewable through the front display surface 116 or the back display surface 118. Alternatively, the display controller can activate the display device for transparency to permit the displayed image 122 being viewable through the front and back display surfaces. Similarly, the display controller can activate the display device for a transparent view of the environment 124, which is viewable through the display device. For example, the display controller can control and switch-on the multi-mode panel 134 of the display device to prevent a displayed image from being viewable through the back display surface, or switch-off the multi-mode panel for transparency to permit the displayed image being viewable through the back display surface.

The portable device 102 may be configured as any type of client or user device that includes fixed or mobile, wired and/or wireless devices, and may be implemented as a consumer, computer (e.g., a laptop or tablet device), portable, communication, phone (e.g., a dual-display phone), appliance, gaming, media playback, and/or electronic device. The portable device can be implemented with one or more processors, data communication components, memory components, navigation components, data processing and control circuits, and a display system. Further, any of the portable devices described herein can be implemented with any number and combination of differing components as further described with reference to the example device shown in FIG. 5.

Figure 2:
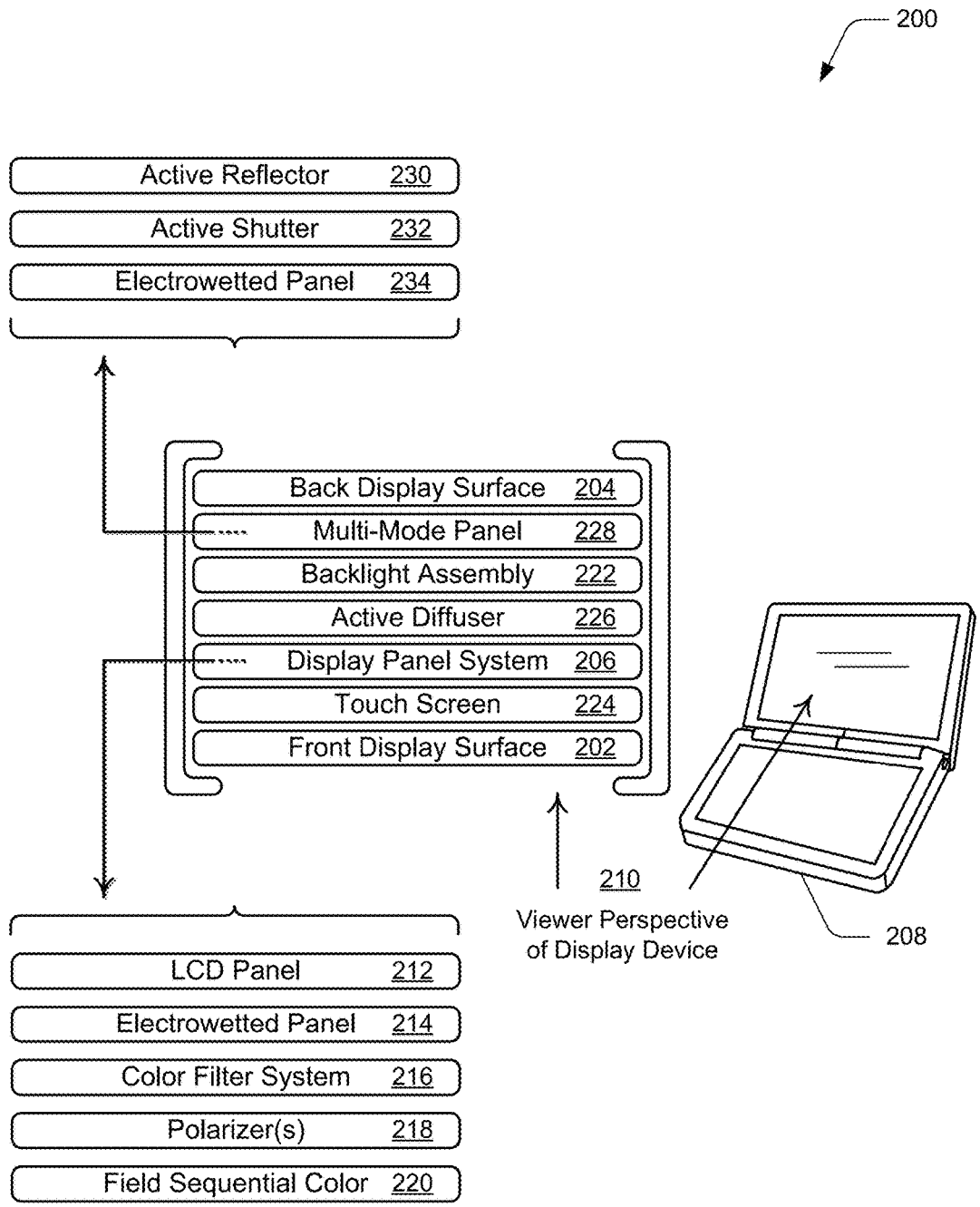
FIG. 2 illustrates an example transparent display assembly in accordance with one or more embodiments.

FIG. 2 illustrates an example transparent display assembly 200 that includes various display panels and surfaces as described above with reference to FIG. 1. Embodiments of a transparent display backlight assembly are implemented to maximize light efficiency and transparency. The transparency of a display device may be diminished, primarily due to polarizers (e.g., in an LCD implementation), color filters, and the light efficiency of a light source used to illuminate a display panel. As described above, the transparency of a transparent display may be a percentage of transparency as measured and/or as visually determined or perceived by a user when viewing through the transparent display assembly.

The transparent display assembly 200 includes a front display surface 202 and a back display surface 204. The front display surface and the back display surface are viewable from opposite sides of the transparent display assembly. In addition to the front and back display surfaces, the transparent display assembly includes a display panel system 206 that is located between the front and back display surfaces. The display panel system displays images that are viewable through the front and/or back display surfaces of the transparent display assembly. A user of a device 208 that includes the transparent display assembly may generally view the display through the front display surface 202, shown for reference as a viewer perspective of the display at 210.

In various embodiments, the display panel system 206 may include any one or combination of an LCD panel 212, an electrowetted panel 214, a color filter system 216 that may be implemented as a passive or active system, one or more polarizers 218 that may be implemented as passive or active, and/or an implementation of field sequential color 220. The LCD panel 212 can be implemented as a transparent LCD panel. An LCD implementation includes polarizers, and may include an implementation of field sequential color rather than using color filters. The color filter system 216 can be implemented for a percentage of transparency that permits an image being viewable through the display device. Similarly, the polarizers 218 can be implemented for a percentage of transparency that permits the image being viewable through the display device. In embodiments, an implementation of field sequential color 220 may be utilized in place of the color filters.

The transparent display assembly 200 also includes a backlight assembly 222 that illuminates the display panel for image display. The backlight assembly includes a light source and a backlight panel that directs the light to illuminate the display panel of the transparent display assembly. In this example, the transparent display assembly also includes a touch screen 224 and an active diffuser 226 that scatters and/or diffuses the light to uniformly illuminate the display panel.

A multi-mode panel 228 of the transparent display assembly 200 is located between the front display surface 202 and the back display surface 204. The multi-mode panel may be implemented to switch on and/or off the entire panel, sections of the panel, and/or individual pixels of the panel. In various embodiments, the multi-mode panel may include any one or combination of an active reflector 230, an active shutter 232, and/or an implementation of an electrowetted panel 234 (e.g., implemented as an active reflector). The active reflector and/or active shutter can be implemented to permit or prevent one side of a display from being viewable, such as through the back display surface.

The active reflector 230 and the active shutter 232 are operable to switch-on and prevent an image from being viewable through the front display surface 202 or the back display surface 204, and further operable to switch-off for transparency to permit the image being viewable through the front and back display surfaces. The active reflector 230 can be implemented as a dual-state mirror having a transparent state for transparency, and a reflective state to reflect and recycle light that is lost, such as from an illuminated light guide to illuminate the display. The active shutter 232 can be implemented as an LCD shutter that provides for variable light transmissivity based on an applied voltage. In embodiments, an electrowetting implementation of the electrowetted panel 234 does not include polarizers, and may or may not include color filters. The active diffuser 226 and any of the described multi-mode panel solutions, such as an active reflector, active shutter, or electrowetted panel, can be implemented to operate on the whole panel, sections of the panel, and/or on a pixel-by-pixel basis.

Electrochromatic type materials can be utilized to implement electrically switchable, active panels, such as an active reflector and active diffuser that can be switched-off for transparency. Alternatively or in addition, other electrically switchable materials that have a high transmissivity in an open state and a high reflectance in a closed state may be utilized to implement panels and sections of a transparent display. Materials that have bi-stable properties have no active power component and may also be utilized, particularly for low power modes of a mobile device that includes an integrated transparent display.

Figure 3:
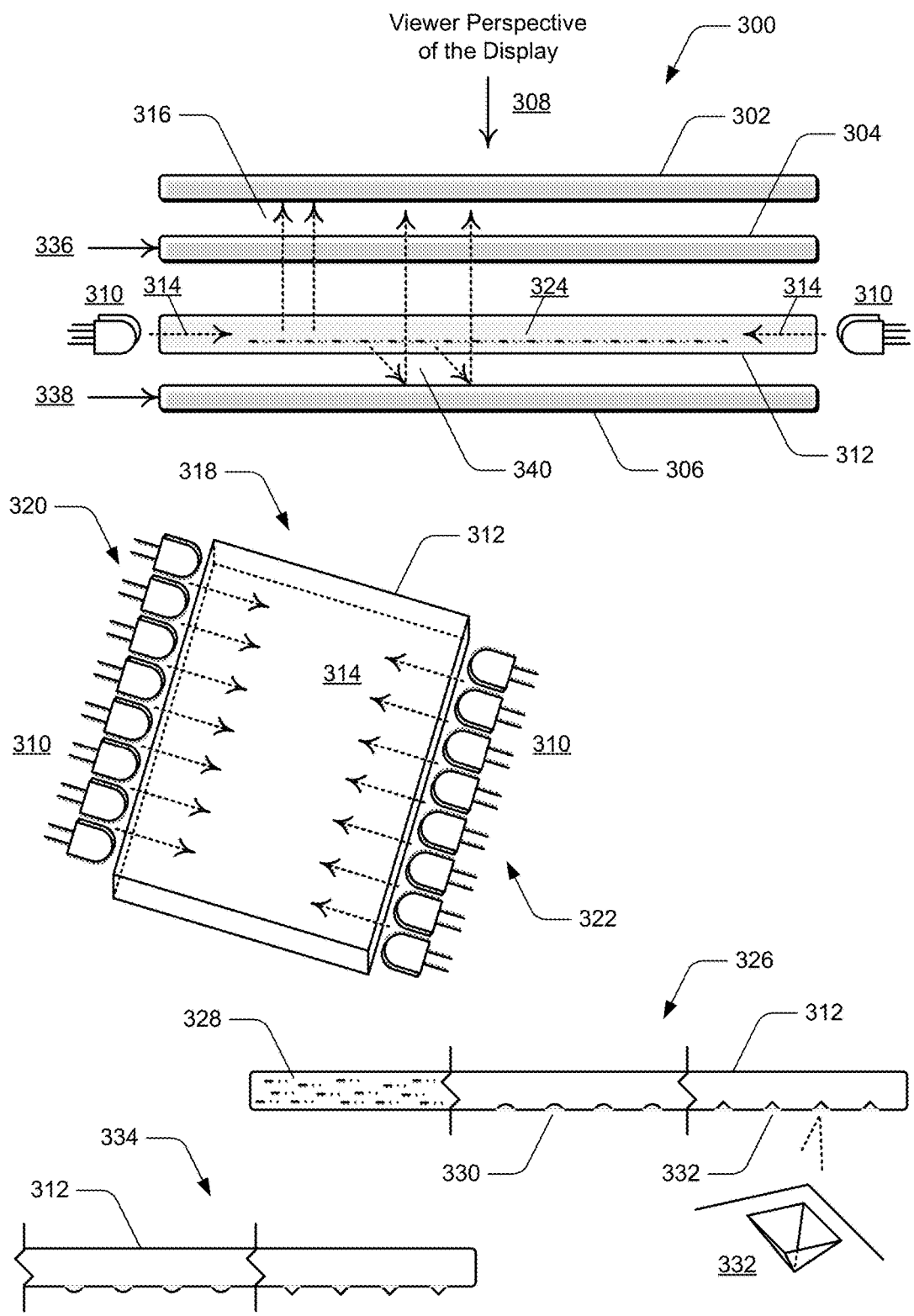
FIG. 3 illustrates an example of a transparent display backlight assembly in accordance with one or more embodiments.

FIG. 3 illustrates an example of display components 300 in embodiments of a transparent display backlight assembly, which may be implemented as components of the transparent display assembly 200 described with reference to FIG. 2. The display components include a display panel 302, such as described with reference to the display panel system, as well as an active diffuser 304 and a multi-mode panel 306 as described with reference to the transparent display assembly shown in FIG. 2. An orientation reference at 308 indicates a viewer perspective of the display panel, such as when a user of a device that includes the display components views the display panel.

The display components also include a backlight assembly that is implemented with a light source 310 and a backlight panel 312. In implementations, the light source 310 can be a white light, or separate RGB colors, which may be utilized for color imaging using field sequential color averaging. The light source generates light 314 and the backlight panel directs the light to illuminate the display panel 302, such as with directed or refracted light at 316. A top view 318 illustrates that the backlight panel 312 can be edge-lit by the light source 310 implemented as arrays of light emitting diodes (LEDs) that generate the light 314. In this example, the light source 310 is a first array 320 of LEDs proximate a first edge of the backlight panel, and a second array 322 of LEDs proximate a second edge of the backlight panel.

The backlight panel 312 is operable as a transparent panel and, in various embodiments, can include light refraction features 324 that refract and scatter the light 314. The light refraction features are spaced for approximate transparency of the backlight panel, yet refract the light to illuminate the display panel 302. A side view 326 of the backlight panel 312 illustrates various implementations of the light refraction features in embodiments of a transparent display backlight assembly. For example, the light refraction features may be implemented as light-scattering particles at 328 embedded in the backlight panel and/or as diffractive optics molded into the backlight panel that refract designated light wavelengths; as micro extraction features formed as hemisphere divots 330 into the backlight panel; and/or as negative prisms 332 formed into the backlight panel. The light refraction features may be implemented as negative features (e.g., recessed as shown in the side view 326), or as positive features extending or protruding from the backlight panel. An additional view 334 of the backlight panel 312 illustrates the light refraction features as positive features.

The negative prisms can be formed as nano-prisms that would refract less light, but increase transparency of the backlight panel. Alternatively, the negative prisms can be formed as micro-prisms that would increase display panel illumination by refracting more light, but may decrease transparency of the backlight panel. In embodiments, the light refraction features can be implemented as a combination of the light-scattering particles embedded in the backlight panel, and the hemisphere divots or the negative prisms.

The active diffuser 304 can be operable as a transparent panel, or activated to uniformly scatter and/or diffuse the light 316 that illuminates the display panel 302 when an activation control input 336 is initiated from the display controller to switch-on the active diffuser. The multi-mode panel 306 can also be activated with an activation control input 338. When switched-on and operable as a reflector, for example, lost light that is generated by the light source and directed away from the display panel is reflected at 340 to further illuminate the display panel 302.

Figure 4:
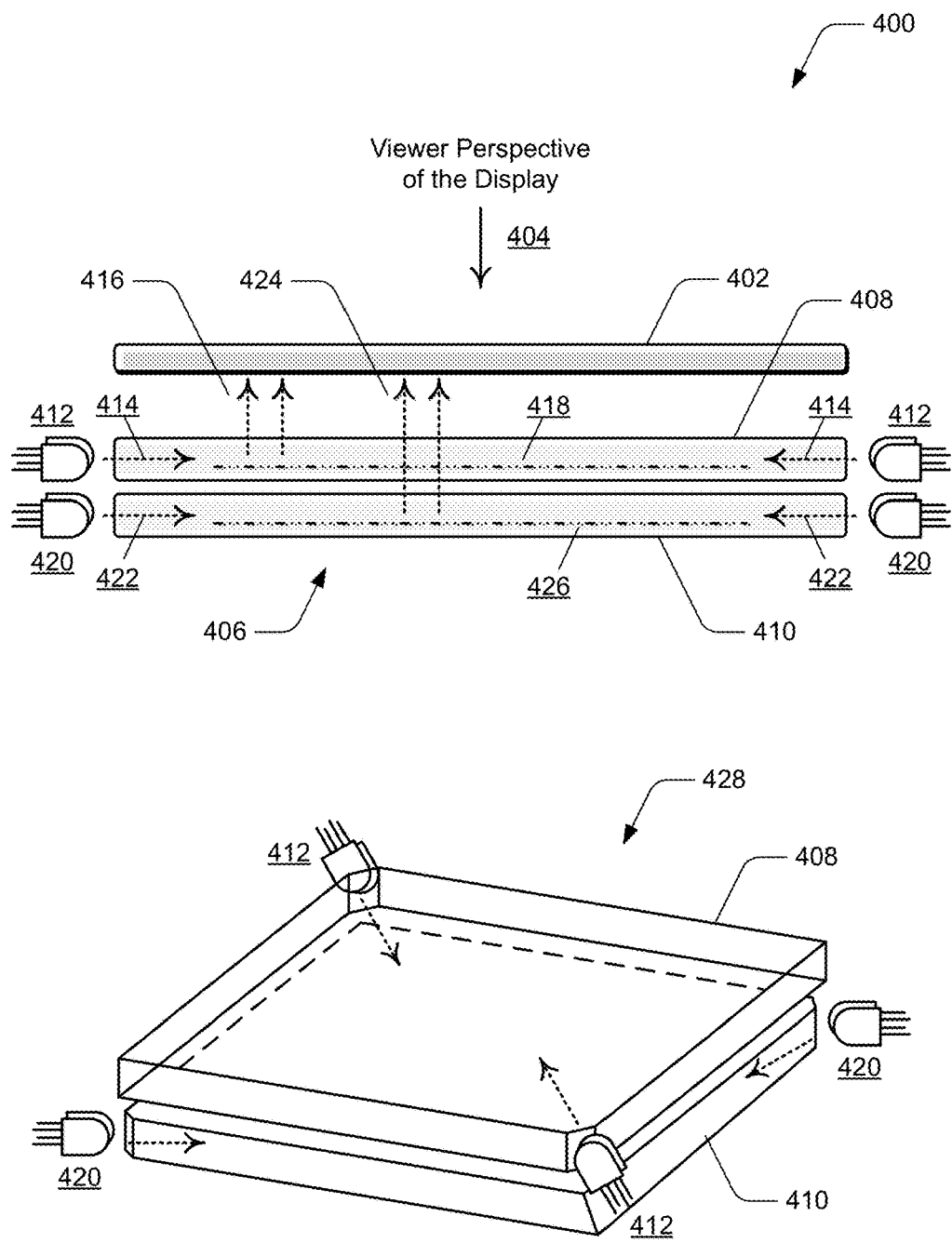
FIG. 4 illustrates another example of a transparent display backlight assembly in accordance with one or more embodiments.

FIG. 4 illustrates an example of display components 400 in embodiments of a transparent display backlight assembly, which may be implemented as components of the transparent display assembly 200 described with reference to FIG. 2. The display components include a display panel 402, such as described with reference to the display panel system of the transparent display assembly shown in FIG. 2. Although not shown, the display components may also include an active diffuser and/or a multi-mode panel as described with reference to FIGS. 1-3. An orientation reference at 404 indicates a viewer perspective of the display panel, such as when a user of a device that includes the display components views the display panel.

The display components 400 include a stacked backlight assembly 406 that is implemented with two or more light guides (also referred to herein as backlight panels). In this example, a first light guide 408 is located proximate a second light guide 410 in a stack configuration. Although only the two light guides are shown in this example implementation, additional light guides may be included in the stacked backlight assembly. The backlight assembly includes light sources 412 that correspond to the first light guide 408, and the light sources generate light 414 that the first light guide directs to illuminate the display panel 402, such as with directed or refracted light at 416. The light sources 412 can be implemented as light emitting diodes (LEDs) that generate a white light, or separate RGB colors. The light guide 408 is operable as a transparent panel and, in various embodiments, can include light extraction features 418 (also referred to as light refraction features) that refract and scatter the light, as described with reference to the light refraction features shown in FIG. 3. The light extraction features are spaced for approximate transparency of the light guide, yet refract the light to illuminate the display panel.

The backlight assembly 406 also includes light sources 420 that correspond to the second light guide 410, and the light sources generate light 422 that the second light guide directs to illuminate the display panel 402, such as with directed or refracted light at 424. The light sources 420 can also be implemented as light emitting diodes (LEDs) that generate a white light, or separate RGB colors. The light guide 410 is operable as a transparent panel and, in various embodiments, can include light extraction features 426 that refract and scatter the light, as described with reference to the light refraction features shown in FIG. 3. The light extraction features are spaced for approximate transparency of the light guide, yet refract the light to illuminate the display panel.

A top view 428 of the stacked backlight assembly 406 illustrates that the first light guide 408 can be edge-lit by the light sources 412. The first light guide is located proximate, such as positioned over, the second light guide 410 in the stack configuration. Similarly, the second light guide 410 can be edge-lit by the light sources 420. In this example, the light sources are positioned on opposite corners of a light guide to uniformly illuminate the respective light guide. In embodiments, the first light guide 408 may be implemented with one or more different types, or different patterns, of light extraction features than the second light guide 410, such as with light extraction features designed for the particular light distribution of the respective light sources.

Example method 500 is described with reference to FIG. 5 in accordance with one or more embodiments of a transparent display backlight assembly. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
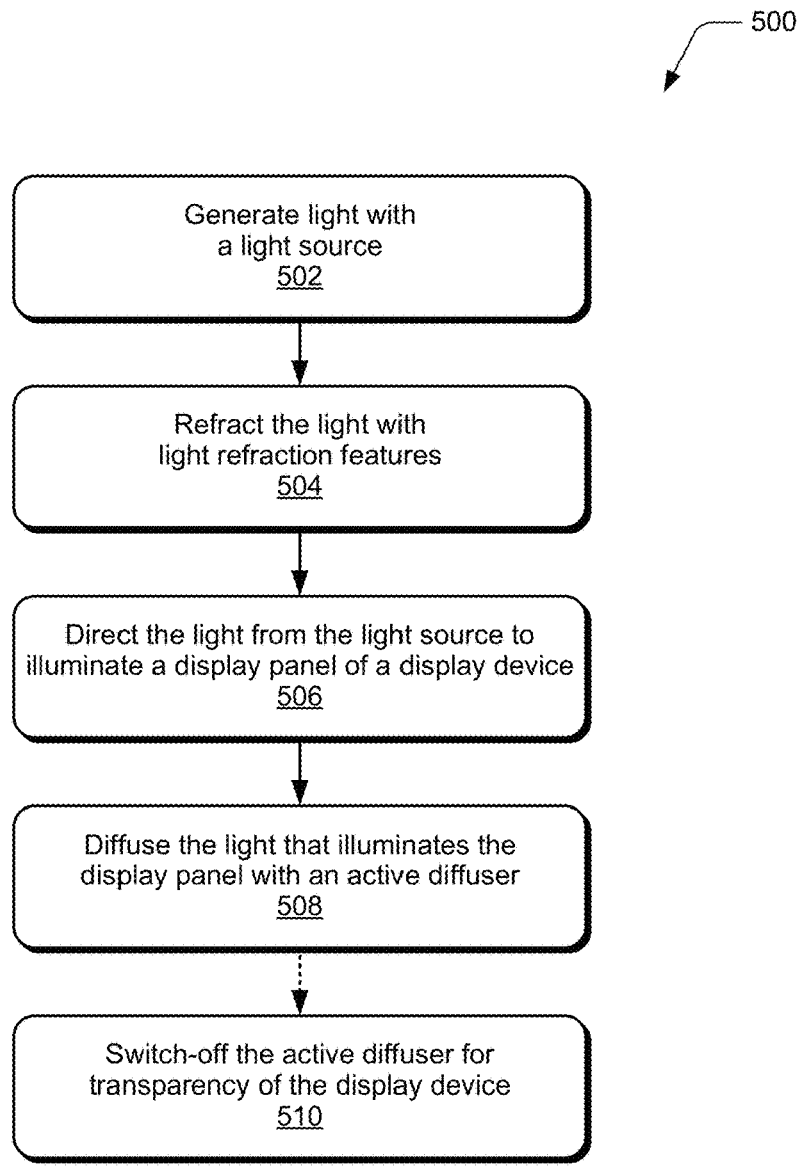
FIG. 5 illustrates example method(s) of a transparent display backlight assembly in accordance with one or more embodiments.

FIG. 5 illustrates example method(s) 500 of a transparent display backlight assembly. The order in which the method blocks are described are not intended to be construed as a limitation, and any number of the described method blocks can be combined in any order to implement a method, or an alternate method.

At block 502, light is generated with a light source. For example, the light source 310 (FIG. 3) generates light 314, which can be generated with arrays of light emitting diodes (LEDs), and the backlight panel 312 is edge-lit by the arrays of LEDs. In an implementation, the light source 310 is a first array 320 of LEDs proximate a first edge of the backlight panel, and a second array 322 of LEDs proximate a second edge of the backlight panel.

At block 504, the light is refracted with light refraction features. For example, the backlight panel 312 can include light refraction features that refract and scatter the light 314. The light refraction features are spaced for approximate transparency of the backlight panel, yet refract the light to illuminate the display panel 302. The light refraction features include any one or combination of the light-scattering particles at 328 embedded in the backlight panel; micro extraction features formed as the hemisphere divots 330 into the backlight panel; diffractive optics configured to refract designated light wavelengths; and/or the negative prisms 332 formed into the backlight panel. The negative prisms may include nano-prisms that would refract less light, but increase transparency of the backlight panel. Alternatively, the negative prisms may include micro-prisms that would increase display panel illumination by refracting more light, but may decrease transparency of the backlight panel.

At block 506, the light is directed from the light source to illuminate the display panel of the display device. For example, the backlight panel 312 directs the light to illuminate the display panel 302, such as with directed or refracted light at 316. At block 508, the light that illuminates the display panel is diffused when activating an active diffuser. For example, the active diffuser 304 uniformly scatters and/or diffuses the light 316 that illuminates the display panel 302 when an activation control input 334 is initiated from the display controller to switch-on the active diffuser.

Optionally at block 510, the active diffuser is switched-off for transparency of the display device.

Figure 6:
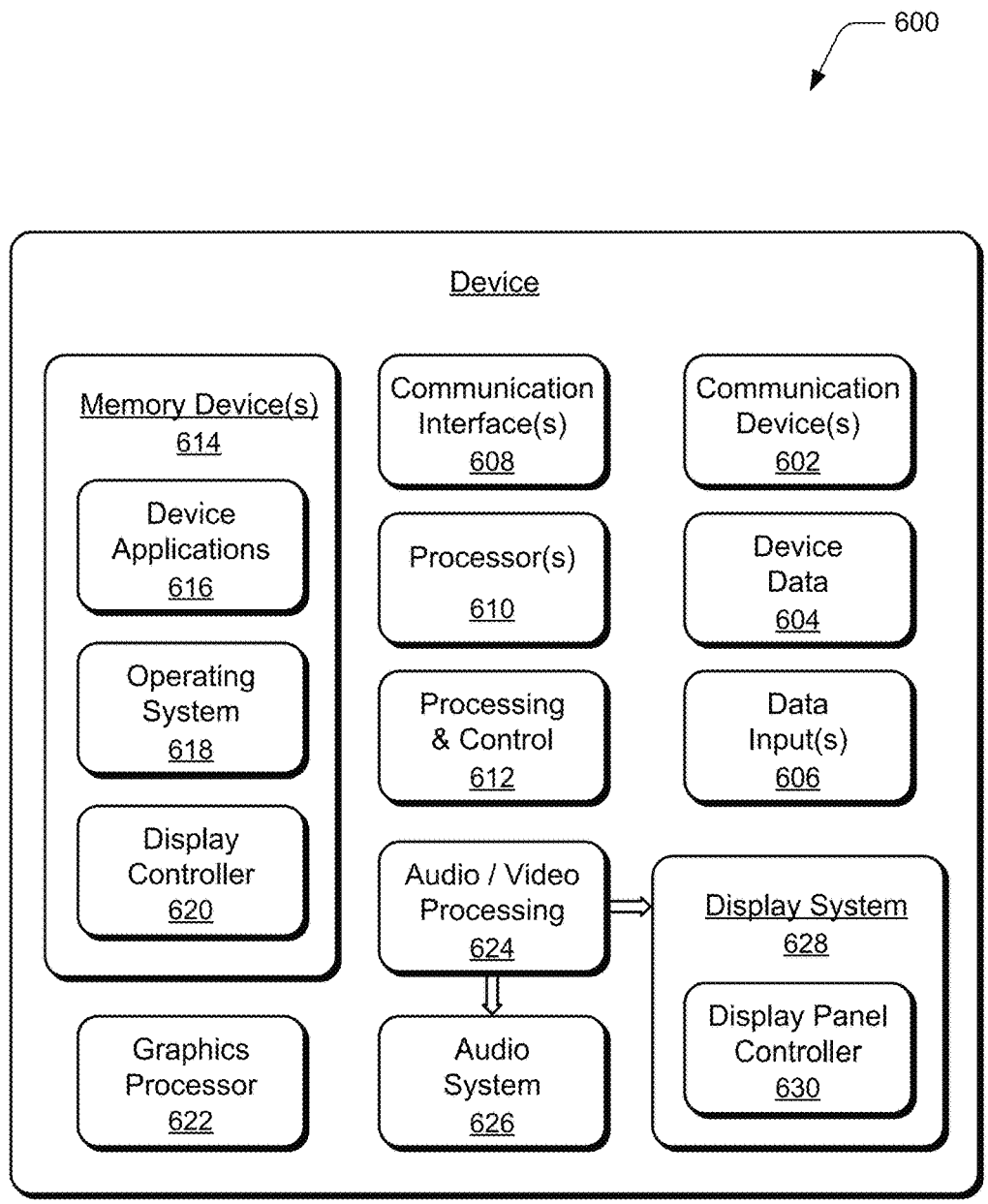
FIG. 6 illustrates various components of an example device that can implement embodiments of a transparent display backlight assembly.

FIG. 6 illustrates various components of an example device 600 that can be implemented as a portable device as described with reference to any of the previous FIGS. 1-5. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as received data, data that is being received, data scheduled for transmission, data packets of the data, etc. The device data or other device content can include configuration settings of the device, media content stored on the device, and/or information associated with a user of the device. Media content stored on the device can include any type of audio, video, and/or image data. The device includes one or more data inputs 606 via which any type of data, media content, and/or inputs can be received, such as user-selectable inputs, messages, communications, music, television content, recorded video content, and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 612. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 614 provides data storage mechanisms to store the device data 604, other types of information and/or data, and various device applications 616. For example, an operating system 618 and a display controller 620 can be maintained as software applications with a memory device and executed on the processors. The device applications may also include a device manager, such as any form of a control application, software application, signal processing and control module, code that is native to a particular device, a hardware abstraction layer for a particular device, and so on.

The device 600 may also include a graphics processor 622, and includes an audio and/or video processing system 624 that generates audio data for an audio system 626 and/or generates display data for a display system 628. The audio system and/or the display system may include any devices that process, display, and/or otherwise render audio, video, display, and/or image data. For example, the display system includes a display panel controller 630. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of a transparent display backlight assembly have been described in language specific to features and/or methods, the subject of the appended claims is not necessarily limited to the specific features or methods described. Rather, the specific features and methods are disclosed as example implementations of a transparent display backlight assembly.

The invention claimed is:

1. A method comprising:
    enabling an environment to be viewed through a display device;
    generating light with a light source;
    refracting the light with light refraction features spaced for a percentage of transparency that permits the environment behind the display device to be viewed through the display device;
    illuminating the display device with the refracted light; and
    switching on an active diffuser to prevent a section of the environment from being viewed through the display device wherein the light refraction features comprise light-scattering particles embedded in a backlight panel of the display device, the light-scattering particles refracting designated light wavelengths.

2. The method as recited in claim 1, further comprising switching off the active diffuser to enable the environment behind the display device to be viewed through the display device.

3. The method as recited in claim 1, wherein the light is refracted through a transparent display panel and the active diffuser is contained in an additional transparent panel of the display device.

4. The method as recited in claim 1, further comprising the active diffuser uniformly illuminating a display panel of the display device.

5. The method as recited in claim 1, wherein the light source comprises one or more arrays of light emitting diodes (LEDs), and the backlight panel is edge-lit by the one or more arrays of LEDs.

6. The method as recited in claim 1, wherein the light refraction features comprise micro extraction features formed as hemisphere divots into the backlight panel.

7. The method as recited in claim 1, wherein the light refraction features comprise negative prisms formed into the backlight panel, the negative prisms comprising nano-prisms configured to increase transparency.

8. A method, comprising:
generating light with a light source in a backlight assembly;
directing the light from the light source with a backlight panel to illuminate a display panel, the backlight panel and the display panel having light refraction features configured for a percentage of transparency that permits an environment to be viewed through the backlight assembly;
scattering the light from the light source with an active diffuser to prevent at least a section of the environment from being viewed through the backlight assembly; and
refracting designated wavelengths of the light with light-scattering particles embedded in the backlight panel.

9. The method as recited in claim 8, further comprising switching off the active diffuser to enable the environment to be viewed through the backlight assembly.

10. The method as recited in claim 8, wherein the light is refracted through the backlight panel and the display panel, and the active diffuser is contained in a transparent panel of the display device.

11. The method as recited in claim 8, further comprising the active diffuser uniformly illuminating the display panel of the backlight assembly.

12. The method as recited in claim 8, wherein the light source comprises one or more arrays of light emitting diodes (LEDs), and the backlight panel is edge-lit by the one or more arrays of LEDs.

13. The method as recited in claim 8, wherein the light-scattering particles are spaced for a percentage of transparency.

14. The method as recited in claim 8, further comprising refracting the light with micro extraction features formed as hemisphere divots into the backlight panel.

15. The method as recited in claim 8, further comprising refracting the light with negative prisms formed into the backlight panel, the negative prisms spaced for a percentage of transparency.

16. A transparent display assembly, comprising:
a light source configured to generate light;
light refraction features configured to refract the light and illuminate the transparent display assembly, the light refraction features spaced for a percentage of transparency that permits an environment behind the transparent display assembly to be viewed through the transparent display assembly; and
an active diffuser configured to switch on to prevent a section of the environment from being viewed through the transparent display assembly
wherein the light refraction features comprise light-scattering particles embedded in a backlight panel of the transparent display assembly, the light-scattering particles refracting designated light wavelengths.

17. The transparent display assembly as recited in claim 16, wherein the active diffuser is configured to switch off to enable the environment to be viewable through the transparent display assembly.

18. The transparent display assembly as recited in claim 16, wherein the light source comprises one or more arrays of light emitting diodes (LEDs), and the backlight panel of the transparent display assembly is edge-lit by the one or more arrays of LEDs.

19. The transparent display assembly as recited in claim 16, wherein the light refraction features further comprise at least one of:
micro extraction features formed as hemisphere divots into the backlight panel; and
negative prisms formed into the backlight panel, the negative prisms comprising nano-prisms configured to increase transparency.

\* \* \* \* \*